United States Patent [19]

Watanabe et al.

[11] Patent Number: 4,545,589
[45] Date of Patent: Oct. 8, 1985

[54] VEHICLE BODY STRUCTURE FOR A LONGITUDINALLY EXTENDING FLOOR TANK AND A GEAR SHIFT MECHANISM

[75] Inventors: Hiroyuki Watanabe, Toyota; Kuniaki Osaka, Susono; Yasushi Tanaka, Toyota, all of Japan

[73] Assignee: Toyota Jidosha Kabushiki Kaisha, Japan

[21] Appl. No.: 581,574

[22] Filed: Feb. 21, 1984

[30] Foreign Application Priority Data

Feb. 21, 1983 [JP]  Japan .................................. 58-27342
Mar. 3, 1983 [JP]  Japan .................................. 58-30870

[51] Int. Cl.$^4$ ............................................. B62K 15/02
[52] U.S. Cl. ...................................... 280/5 A; 180/336
[58] Field of Search .............. 280/5 A, 5 R; 180/89.1, 180/314, 336; 296/208

[56] References Cited

U.S. PATENT DOCUMENTS

| | | | |
|---|---|---|---|
| 3,661,419 | 5/1972 | Mitamura | 280/5 A |
| 3,757,884 | 7/1973 | Tomita et al. | 180/336 |
| 4,453,724 | 6/1984 | Watanabe et al. | 280/5 A |
| 4,457,525 | 7/1984 | Tanaka et al. | 280/5 A |
| 4,469,339 | 9/1984 | Watanabe et al. | |

FOREIGN PATENT DOCUMENTS 57-205277  12/1982  Japan .

OTHER PUBLICATIONS

Copy of Prosecution History of U.S.S.N 374,937 and 383,964.

Primary Examiner—Joseph F. Peters, Jr.
Assistant Examiner—Donn McGiehan
Attorney, Agent, or Firm—Parkhurst & Oliff

[57] ABSTRACT

A vehicle body structure for positioning a gear shift lever upon a central portion of a floor tunnel, underneath which is provided a fuel tank having a complementary shape to that of the fuel tunnel. The displacement of the shift lever is transmitted through a shift linkage to a transmission. The shift linkage extends through a clearance created between a shift lever cover and the floor tunnel and is substantially parallel to the longitudinally extending tunnel.

9 Claims, 6 Drawing Figures

VEHICLE BODY STRUCTURE FOR A LONGITUDINALLY EXTENDING FLOOR TANK AND A GEAR SHIFT MECHANISM

BACKGROUND OF THE INVENTION

The present invention relates to a vehicle body structure for use in a vehicle having a fuel tank positioned underneath a longitudinally extending floor tunnel, and a shift change mechanism on the floor tunnel, and more particularly to a vehicle body structure including a longitudinally long and laterally narrow fuel tank mounted underneath the londitudinally extending floor tunnel.

Vehicles having both an engine and driving wheels forwardly located or rearwardly located, have eliminated the need for a drive shaft extending from a forwardly located engine to rearwardly located drive wheels. Therefore, a fuel tank for storing fuel therein can be placed underneath the longitudinally extending floor tunnel taking the place of the eliminated drive shaft. The floor tunnel longitudinally extends in the vehicle, and has a limited lateral width, to provide for a spacious passenger compartment in the vehicle. Hence, the fuel tank must be sufficiently long in the longitudinal direction to store a practical amount of fuel therein. Further, a gear shift lever, which changes the gearing ratio in a transmission, must be located adjacent to a driver's seat to facilitate easy operation thereof. However, the problem of reducing the space of the projecting floor tunnel while maintaining an equivalent amount of fuel storage, has made it difficult to install a gear shift lever in the restricted passenger compartment.

SUMMARY OF THE INVENTION

The present invention was made in view of the foregoing background and to overcome the foregoing drawbacks. It is accordingly an object of the invention to provide a vehicle body structure for housing a sufficiently large, longitudinally extending fuel tank and a gear shift mechanism in a vehicle.

To attain the above objects, a vehicle body structure according to the present invention includes a floor panel having an upwardly projecting part, which longitudinally extends in the vehicle and houses a longitudinal fuel tank thereunder. A top portion of the upwardly projecting and longitudinally extending floor panel has a downwardly concave portion which facilitates mounting of the gear shift mechanism.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
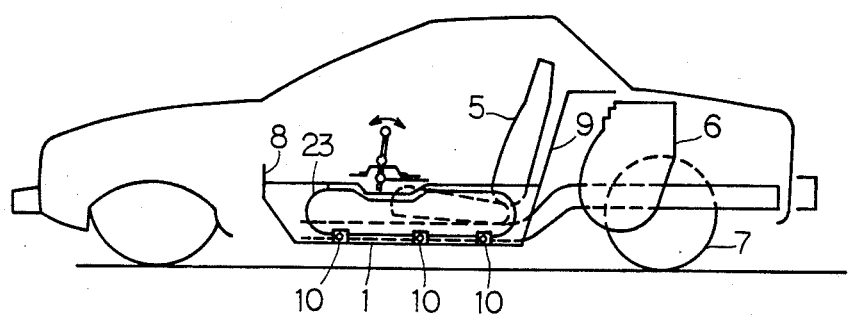
FIG. 1 is a partially cross-sectional, enlarged detailed side view of a vehicle body structure of the present invention.
Figure 2:
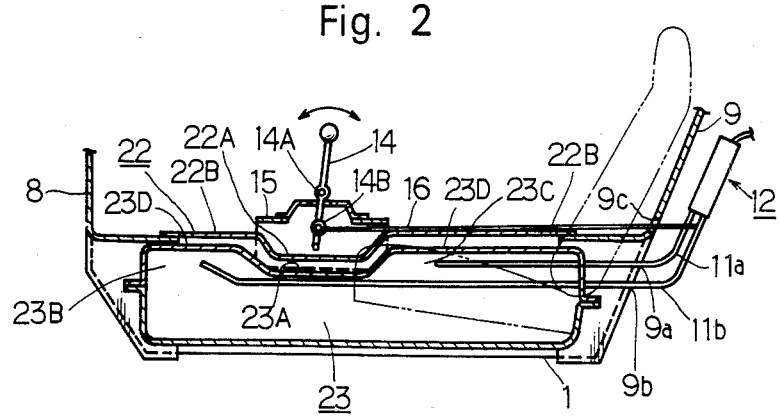
FIG. 2 is a partially cross-sectional, enlarged detailed view of a vehicle body structure according to a first embodiment of the present invention.
Figure 3:
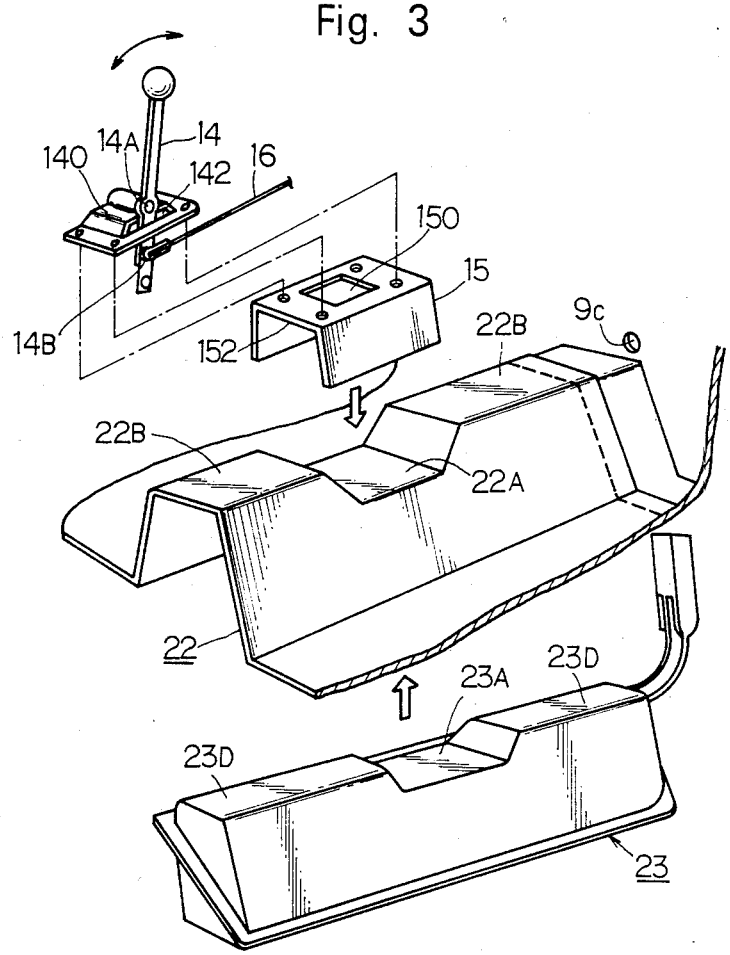
FIG. 3 is a disassembled perspective view of the vehicle body structure according to the first embodiment of the present invention.

FIG. 1 shows a partially cross-sectional side view of a vehicle employing a vehicle body structure of the present invention. FIGS. 2 and 3 show enlarged and detailed views of the vehicle body structure according to a first embodiment of the present invention. An engine 6 is mounted at a position over rear wheels 7. The numeral 5 represents a passenger seat which is located longitudinally in front of the engine 6. A back panel 9 is provided at a position between the passenger seat 5 and the engine 6, to shield the passenger compartment from noise generated by the engine. A floor panel 1 longitudinally extends in the vehicle, and the front end of the floor panel 1 is secured to a dash panel 8, upon which various instruments are mounted. The back panel 9 is secured to the floor panel 1 at a position located longitudinally behind the seat 5 in the vehicle. The floor panel 1 has an upwardly projecting and longitudinally extended portion in the vehicle which forms a floor tunnel 22 for housing a fuel tank 23 therein. The fuel tank 23 is fastened to the floor panel 1 by bands 10.

A shift lever 14 is provided near a central portion of the floor tunnel 22. The floor tunnel 22 includes a front part 22B, a central part 22A, and a rear part 22B. The central portion 22A of the floor tunnel 22 is downwardly concave to prevent contact between the shift lever 14 and the floor tunnel 22. The fuel tank 23 also has a downwardly concave portion 23A, which is complementary to the downwardly concave portion 22A of the floor tunnel 22, and projecting portions 23D which are complementary to the portions 22B of the floor tunnel 22.

Figure 6:
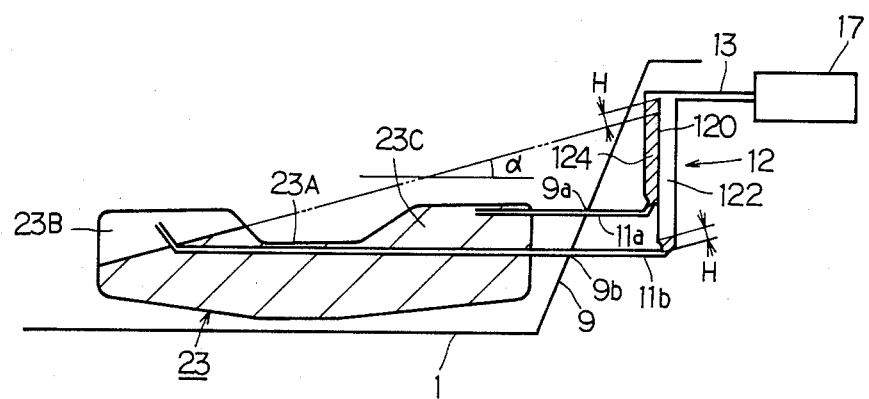
FIG. 6 is a schematic view illustrating the fuel tank and a vapor separator.

The shift lever 14 is mounted in the downwardly concave portion 22A, which therefore necessitates only a small amount of clearance between a central under face 152 of a shift lever support bracket 15 and a top face of the rear portion 22B of the floor tunnel 22, to pass a shift linkage 16 therebetween. The shift linkage 16 is connected with the shift lever 14 at one end thereof and with a transmission (not shown in drawings) at another end thereof. The shift linkage 16 transmits the movement of the shift lever 14 to the transmission. The front and rear portions 22B of the floor tunnel 22 are closely located to the bracket 15 because of the small clearance between the central underface 152 of the shift lever support bracket 15 and the top face of the rear portion 22B of the floor tunnel 22. As a result, the height of the fuel tank 23 can be larger than that of a conventional longitudinal fuel tank. Therefore, the longitudinal length of the fuel tank can be shorter than the longitudinal length of a conventional fuel tank, while maintaining a constant volume capacity. Hence, a water head "H" can be of a small value, even when a vehicle runs on a road having a maximum incline of "α", without having fuel overflow in a vapor separator 12, as shown in FIG. 6. The small size of the water head "H" enables the height of the vapor separator 12 to be correspondingly smaller.

The fuel tank 23 has a front chamber 23B and a rear chamber 23C therein. The vapor separator 12 is provided at a position which is longitudinally behind the fuel tank 23 and the back panel 9. The vapor separator 12 separates the vapor generated in the fuel tank 23 from the fuel stored in the fuel tank 23. FIG. 6 discloses that the vapor separator 12 has tubular chambers 122 and 124 divided by a partition 120. A vent tube 11a connects a bottom portion of the chamber 124 with an upper portion of the rear chamber 23C of the fuel tank 23. The vent tube 11a extends through a hole 9a provided in the back panel 9. Similarly, another vent tube 11b connects a bottom portion of the chamber 122 with an upper portion of the front chamber 23C of the fuel tank 23. The vent tube 11b extends through a hole 9b provided in the back panel 9. The upper portions of the tubular chambers 122 and 124 are connected through a pipe 13 with a canister 17. The canister 17 adsorbs any fuel vapor generated in the fuel tank 23.

FIGS. 1 through 3 show that the gear shift lever 14 can be forwardly or rearwardly roated about a shaft 14A, which is performed by an operator of the vehicle while shifting the transmission. The gear shift lever 14 is pivotally mounted on a shift lever cover 140, which supports the shaft 14A. The shift lever cover 140 has a longitudinally extending slot 142, through which the gear shift lever 14 downwardly extends. The shift linkage 16 is secured to a lower connecting point 14B on the gear shift lever 14, to transmit the movement of the gear shift lever 14 to the transmission. The vertical depth of the downwardly concave portion 22A is designed to be smaller than the vertical depth of the downwardly concave portion 23A, because the lower connecting point 14B is not positioned at the innermost portion of the gear shift lever 14, but rather at a portion between the innermost portion and outermost portion on the gear shift lever 14.

The shift linkage 16 rearwardly extends in a substantially parallel manner to the rear portion 22B, alwlays remaining outside of the longitudinal tunnel 22, and extends through a hole 9c created in the back panel 9. The shift lever cover 140 is fastened to the shift lever support bracket 15, such that the shift lever 14 downwardly extends through a central opening 150 in the shift lever support bracket 15, allowing for the lever 14 to be forwardly and rearwardly rotated. The shift lever support bracket 15 is mounted on the downwardly concave portion 22A of the floor tunnel 22. The shift lever support bracket 15 has a cross-sectional shape of a trapezoid. FIG. 2 shows the position of all members as assembled. A clearance is provided between a lower face portion of the shift lever support bracket 15 and a top face of the projecting portion 22B of the floor tunnel 22, so that the shift linkage 16 can be rearwardly extended.

Figure 4:
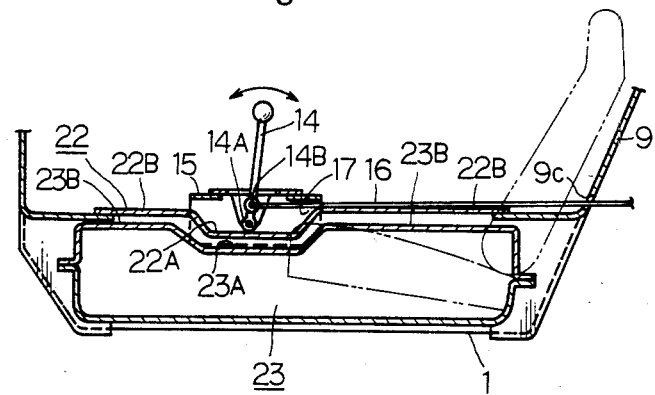
FIG. 4 is a partially cross-sectional enlarged detailed view of a vehicle body structure according to a second embodiment of the present invention.
Figure 5:
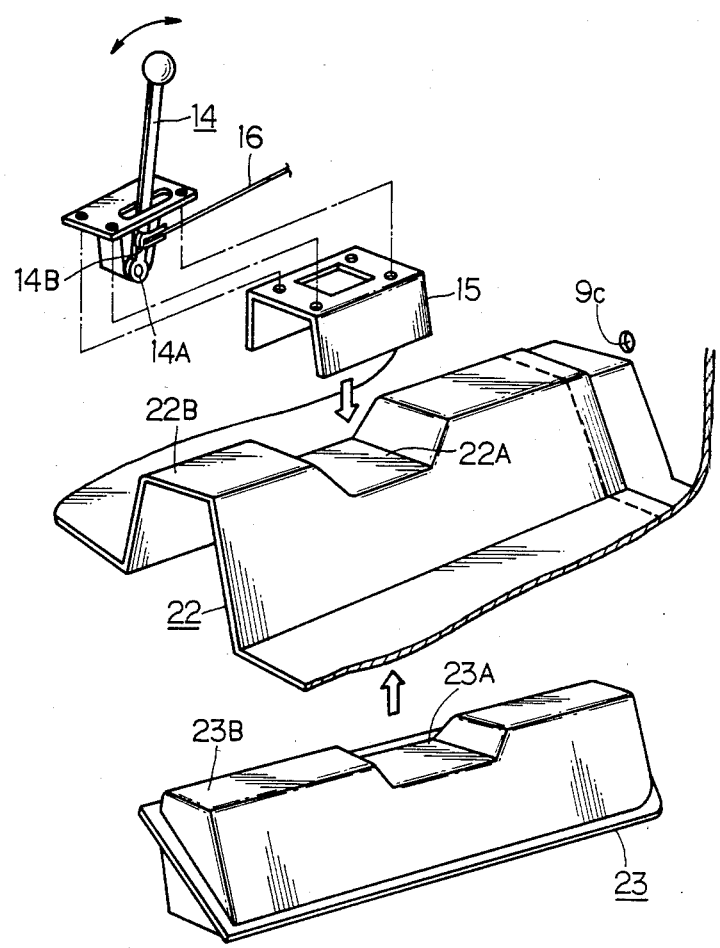
FIG. 5 is a disassembled perspective view of the vehicle body structure according to the second embodiment of the present invention.

FIGS. 4 and 5 disclose a second embodiment of the present invention. FIG. 4 shows an assembled view of all the parts and FIG. 5 shows a disassembled perspective view of a vehicle body structure according to the second embodiment. The difference between the first embodiment and the second embodiment is that the shift lever 14, according to the second embodiment, is mounted so that it is rotatable around a shaft 14A, which is provided at the outermost portion of the shift lever 14.

According to the present embodiments, a rear engine rear wheel drive type vehicle is disclosed. However, the present invention may be applied to a front engine front wheel drive type vehicle. In this case, the shift linkage will forwardly extend.

While the present invention has been described in its preferred embodiments, it is to be understood that the invention is not limited thereto, and may be otherwise embodied within the scope of the following claims.

What is claimed is:

1. A vehicle body structure, comprising:
a longitudinally extending floor panel;
a vertical extension of the longitudinally extending floor panel forming a floor tunnel longitudinally extending in the vehicle, the floor tunnel having a front portion, a rear portion and a central portion, the central portion being downwardly concave with respect to the front portion and rear portion;
a fuel tank located underneath the floor tunnel, the fuel tank having a shape which is complementary to the floor tunnel and including a chamber forwardly located in the tank, a chamber centrally located in the tank and a chamber rearwardly located in the tank;
a vapor separator means for separating vapor generated within the fuel tank from fuel stored in the fuel tank;
a first connecting means for connecting an inside portion of the fuel tank with the vapor separator, a first portion of the first connecting means extending from the vapor separator to the front chamber of the fuel tank and a second portion of the first connecting means extending from the vapor separator to the rear chamber of the fuel tank;
a canister for adsorbing fuel vapor through the vapor separator;
a second connecting means for connecting the vapor separator with the canister; and
a gear shift lever for changing a transmission ratio, the gear shift lever being located in the downwardly concave central portion of the floor tunnel and having an outermost end and an innermost end.

2. The vehicle body structure of claim 1, wherein the structure further comprises a gear shift lever support bracket, into which the gear shift lever is pivotally mounted, the bracket being mounted adjacent the downwardly concave central portion of the floor tunnel.

3. The vehicle body structure of claim 2, wherein the vapor separator is located longitudinally behind the longitudinal rear end of the floor tunnel and vertically above the floor tunnel, and the first connecting means extends within the floor tunnel.

4. A vehicle body structure of claim 3, wherein the gear shift lever is pivotally mounted adjacent the innermost portion of the gear shift lever.

5. The vehicle body structure of claim 3, wherein the gear shift lever is pivotally mounted at a portion between the outermost portion and innermost portion of the gear shift lever.

6. A vehicle body structure, comprising:
a longitudinally extending floor panel;
a vertical extension of the longitudinally extending floor panel forming a floor tunnel longitudinally extending in the vehicle, the floor tunnel having a front portion, a rear portion and a central portion, the central portion being downwardly concave with respect to the front portion and rear portion;

a fuel tank located underneath the floor tunnel, the fuel tank having a shape which is complementary to the floor tunnel and including a chamber forwardly located in the tank, a chamber centrally located in the tank and a chamber rearwardly located in the tank;

a gear shift lever for changing a transmission ratio, the gear shift lever being locating in the downwardly concave central portion of the floor tunnel; and a means for transmitting the movement of the gear shift lever to a transmission having a first end connected to the gear shift lever and a second end connected to the transmission, the means being located adjacent the longitudinally extending floor tunnel.

7. The vehicle body structure of claim 6, wherein the structure further comprises a shift lever cover for pivotally mounting the gear shift lever, the gear shift lever having an innermost end and an outermost end and a shift lever support bracket for mounting the shift lever cover thereon.

8. The vehicle body structure of claim 7, wherein the gear shift lever is pivotally mounted adjacent the innermost portion of the gear shift lever.

9. The vehicle body structure of claim 7, wherein the gear shift lever is pivotally mounted at a portion between the outermost portion and innermost portion of the gear shift lever.

* * * * *